(12) United States Patent
Park et al.

(10) Patent No.: US 9,639,764 B2
(45) Date of Patent: May 2, 2017

(54) IMAGE RECOGNITION SYSTEM FOR VEHICLE FOR TRAFFIC SIGN BOARD RECOGNITION

(71) Applicant: PLK TECHNOLOGIES CO., LTD., Seoul (KR)

(72) Inventors: Kwang Il Park, Seoul (KR); Sang Mook Lim, Seoul (KR); Jin Hyuck Kim, Seoul (KR)

(73) Assignee: PLK TECHNOLOGIES CO., LTD., Seoul (KR)

( * ) Notice: Subject to any disclaimer, the term of this patent is extended or adjusted under 35 U.S.C. 154(b) by 158 days.

(21) Appl. No.: 14/765,004

(22) PCT Filed: May 1, 2014

(86) PCT No.: PCT/KR2014/003902
§ 371 (c)(1),
(2) Date: Jul. 31, 2015

(87) PCT Pub. No.: WO2015/016461
PCT Pub. Date: Feb. 5, 2015

(65) Prior Publication Data
US 2015/0371097 A1 Dec. 24, 2015

(30) Foreign Application Priority Data
Jul. 31, 2013 (KR) .......................... 10-2013-0090630

(51) Int. Cl.
*G06K 9/00* (2006.01)
*H04N 5/00* (2011.01)
(Continued)

(52) U.S. Cl.
CPC ....... *G06K 9/00818* (2013.01); *H04N 5/2253* (2013.01); *H04N 5/2352* (2013.01);
(Continued)

(58) Field of Classification Search
CPC .......... G06K 9/00825; G06K 9/00818; G06K 2009/2045
See application file for complete search history.

(56) References Cited

U.S. PATENT DOCUMENTS 6,295,415 B1 * 9/2001 Kashiyama ............ G03B 7/091
355/40
7,733,464 B2 6/2010 David et al.
(Continued)

FOREIGN PATENT DOCUMENTS

CN 101359148 A 2/2009
JP 2010-148130 A 7/2010
(Continued)

OTHER PUBLICATIONS

Chinese Office Action issued Oct. 10, 2016.

*Primary Examiner* — Utpal Shah
(74) *Attorney, Agent, or Firm* — Rabin & Berdo, P.C.

(57) ABSTRACT

The present invention can improve the recognition performance of a traffic sign board, improve the recognition performance of a reflective traffic sign board and a light emitting type traffic sign board by adjusting an exposure of a camera, improve the recognition performance of the reflective traffic sign board and the light emitting type traffic sign board by adjusting gain of an image signal, and improve the recognition performance of the reflective traffic sign board and the light emitting type traffic sign board by simultaneously adjusting the exposure of the camera and the gain of the image signal. In an image recognition system for a vehicle for traffic sign board recognition according to the present invention, an exposure time of a camera lens or gain of an image output from an image sensor is adjusted to generate at least one image group including a plurality of frames in which the exposure time and the gain are different from each other, sign board regions of the plurality of frames
(Continued)

are compared with each other, and an image nearest to a predetermined set value is selected.

1 Claim, 6 Drawing Sheets

(51) Int. Cl.
  *H04N 5/235* (2006.01)
  *H04N 5/225* (2006.01)
  *H04N 5/243* (2006.01)

(52) U.S. Cl.
  CPC ......... *H04N 5/2353* (2013.01); *H04N 5/2354* (2013.01); *H04N 5/2356* (2013.01); *H04N 5/243* (2013.01)

(56) References Cited

U.S. PATENT DOCUMENTS

| | | | |
|---|---|---|---|
| 2005/0128063 A1* | 6/2005 | Isaji | B60W 10/06 340/439 |
| 2005/0269481 A1 | 12/2005 | David et al. | |
| 2008/0024606 A1* | 1/2008 | Kawasaki | G03B 7/08 348/148 |
| 2008/0181597 A1* | 7/2008 | Tamura | G03B 15/05 396/164 |
| 2008/0309517 A1* | 12/2008 | Saito | B60R 1/00 340/937 |
| 2009/0174809 A1* | 7/2009 | Mochida | G03B 7/28 348/362 |
| 2009/0225189 A1* | 9/2009 | Morin | H04N 5/345 348/229.1 |
| 2010/0102990 A1* | 4/2010 | Kamioka | G01J 1/18 340/942 |
| 2010/0172542 A1* | 7/2010 | Stein | G06K 9/00798 382/103 |
| 2011/0193990 A1* | 8/2011 | Pillman | H04N 5/23245 348/229.1 |
| 2012/0093372 A1* | 4/2012 | Liu | G01C 3/08 382/106 |
| 2012/0162426 A1* | 6/2012 | Murao | H04N 5/235 348/148 |
| 2012/0212616 A1* | 8/2012 | Usami | H04N 5/232 348/148 |
| 2013/0194424 A1* | 8/2013 | Furusawa | H04N 5/235 348/148 |
| 2014/0055572 A1* | 2/2014 | Shirai | H04N 5/2258 348/47 |
| 2014/0313369 A1* | 10/2014 | Kageyama | G06T 11/001 348/223.1 |

FOREIGN PATENT DOCUMENTS

| | | |
|---|---|---|
| KR | 10-2013-0030667 A | 3/2013 |
| KR | 10-2013-0052334 A | 5/2013 |
| KR | 10-1259836 B1 | 5/2013 |

* cited by examiner

IMAGE RECOGNITION SYSTEM FOR VEHICLE FOR TRAFFIC SIGN BOARD RECOGNITION

FIELD OF THE INVENTION

The present invention relates to an ADAS image recognition technology for a vehicle, and particularly, to an ADAS image recognition system mounted in a vehicle to recognize a traffic sign board installed on a road during traveling.

BACKGROUND OF THE INVENTION

ADAS (Advanced Driver Assistance System) generally indicates a technology for improving the convenience and safety of a driver by using a sensor capable of recognizing a peripheral environment while a vehicle is traveling and control devices capable of determining the traveling state of the vehicle and deciding the movement of the vehicle. An ADAS image recognition apparatus recognizes information (a lane, another vehicle, a light source, a pedestrian, and a traffic sign board) on a road, on which a vehicle is traveling, by using an image recognition technology.

Since a traffic sign board has been typically manufactured by drawing a standardized mark having a specific shape on a circular or triangular plate, there have been made efforts to develop a traffic sign board recognition apparatus for recognizing the shape and mark of the traffic sign board by using an image processing technique, to inform a driver of a current traveling environment on a road, and to improve traveling safety and convenience.

Recently, an LED is mainly applied to a traffic sign board in Europe, and is also partially introduced in South Korea. Since a light emitting type sign board is less affected by peripheral illumination and the content of the sign board can be variably displayed or luminance can be changed, it is applied for improvement of visibility at night, traffic, and a change in a limit speed due to weather.

Since the ADAS image recognition apparatus processes a digital image input through a camera by using a numerical analysis technique, its performance may be largely depend on the characteristics of an input image.

In the case of a reflective traffic sign board, since sunlight in the daytime, a street light at night, and headlights of its own vehicle and other vehicles are mainly reflected by the traffic sign board, are incident into a camera of the ADAS image recognition apparatus, and are converted into a digital image, the reflective traffic sign board is largely affected by the brightness or direction of a peripheral light source. Meanwhile, in the case of the light emitting type sign board, since light emitted from its own light source, regardless of other light sources, is incident into a camera of the image recognition apparatus, it is not affected by a peripheral light source. Due to such a difference of characteristics therebetween, it is difficult to capture two types of traffic sign boards so as to be recognized in the same camera.

That is, traffic sign board detection and recognition technologies are developed in order to achieve an intelligent vehicle system capable of performing manless driving, but a technology capable of reliably recognizing both the reflective traffic sign board and the light emitting type sign board is not still proposed in these technologies.

SUMMARY OF THE INVENTION

In view of the above, the present invention has an object for providing an image recognition system for a vehicle for traffic sign board recognition, capable of improving the recognition performance of a traffic sign board.

The present invention has an object for providing an image recognition system for a vehicle for traffic sign board recognition, capable of improving the recognition performance of a reflective traffic sign board and a light emitting type traffic sign board by adjusting an exposure of a camera.

Furthermore, the present invention has an object for providing an image recognition system for a vehicle for traffic sign board recognition, capable of improving the recognition performance of a reflective traffic sign board and a light emitting type traffic sign board by adjusting an amplification ratio of an image signal.

Furthermore, the present invention has an object for providing an image recognition system for a vehicle for traffic sign board recognition, capable of improving the recognition performance of a reflective traffic sign board and a light emitting type traffic sign board by simultaneously adjusting an exposure of a camera and an amplification ratio of an image signal.

In the image recognition system for a vehicle for traffic sign board recognition in accordance with the present invention, an exposure time of a camera lens or gain of an image output from an image sensor can be adjusted to generate at least one image group including a plurality of frames in which the exposure time and the gain are different from each other, sign board regions of the plurality of frames can be compared with each other, and an image nearest to a predetermined set value can be selected.

Preferably, at least one of the plurality of frames is an auto-exposure control frame in which brightness of entire of a screen or a region of interest in the screen is constantly maintained.

Preferably, the auto-exposure control frame can be acquired by fixing the exposure time of the camera lens and adjusting the gain of the image.

Preferably, the auto-exposure control frame can be acquired by fixing the gain of the image and adjusting the exposure time of the camera lens.

Preferably, the auto-exposure control frame can be acquired by adjusting the exposure time of the camera lens and the gain of the image.

Preferably, at least one of the plurality of frames is an over-exposure control frame in which brightness of the image is maintained to be bright as compared with the auto-exposure control frame.

Preferably, the over-exposure control frame can be acquired by maintaining the exposure time of the camera lens to be equal to that of the auto-exposure control frame and increasing the gain of the image.

Preferably, the over-exposure control frame can be acquired by maintaining the gain of the image to be equal to that of the auto-exposure control frame and extending the exposure time of the camera lens.

Preferably, the over-exposure control frame can be acquired by increasing the gain of the image and the exposure time of the camera lens as compared with those of the auto-exposure control frame.

Preferably, the over-exposure control frame can be acquired by increasing multiplication of the gain of the image and the exposure time of the camera lens as compared with multiplication of those of the auto-exposure control frame.

Preferably, at least one of the plurality of frames is a low exposure control frame in which brightness of the image is maintained to be dark as compared with the auto-exposure control frame.

Preferably, the low exposure control frame can be acquired by maintaining the exposure time of the camera lens to be equal to that of the auto-exposure control frame and decreasing the gain of the image.

Preferably, the low exposure control frame can be acquired by maintaining the gain of the image to be equal to that of the auto-exposure control frame and shortening the exposure time of the camera lens.

Preferably, the low exposure control frame can be acquired by decreasing the gain of the image and the exposure time of the camera lens as compared with those of the auto-exposure control frame.

Preferably, the low exposure control frame can be acquired by decreasing multiplication of the gain of the image and the exposure time of the camera lens as compared with multiplication of those of the auto-exposure control frame.

Preferably, at least one of the plurality of frames is a fixed exposure control frame in which the exposure time of the camera lens and the gain of the image are constantly maintained.

Preferably, at least one of the plurality of frames is a frame in which the exposure time of the camera lens is constantly maintained and the gain of the image is controlled such that an average brightness of the region of interest is equal to a preset reference value.

Preferably, the brightness of the auto-exposure control frame can be compared with a brightness of an input image, it can be determined as a daytime condition when the brightness of the input image is equal to or more than the brightness of the auto-exposure control frame, and the exposure time or the gain can be changed and applied with respect to at least one of the plurality of frames forming the image group.

Preferably, by using a head lamp signal of a vehicle, it can be determined as a daytime condition when the head lamp signal is OFF, and parameter setting of at least one of the plurality of frames forming group 1 can be changed and applied.

A traffic sign board recognition method includes the steps of: acquiring an image group including a plurality of frames; searching for bands having predetermined colors and predetermined shapes from an auto-exposure control frame of the plurality of frames; comparing brightnesses of the bands existing in the plurality of frames of the image group with each other when there exist the bands having predetermined colors and predetermined shapes; selecting a frame including a band nearest a preset reference value among the bands existing in the plurality of frames; and performing image processing on the selected frame and recognizing a sign board.

An image recognition apparatus for a vehicle includes: a central control unit that adjusts an exposure time of a camera lens or gain of an image output from an image sensor and generates at least one image group including frames in which the exposure time and the gain are different from each other; a first storage unit that stores a plurality of parameter sets, each parameter set including the exposure time and the gain; and a second storage unit that stores at least two image frames different from each other.

According to the present invention, it is possible to improve the recognition performance of a reflective traffic sign board and a light emitting type traffic sign board by adjusting an exposure of a camera, to improve the recognition performance of a reflective traffic sign board and a light emitting type traffic sign board by adjusting an amplification ratio of an image signal, and to improve the recognition performance of a reflective traffic sign board and a light emitting type traffic sign board by simultaneously adjusting an exposure of a camera and an amplification ratio of an image signal.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Figure 1:
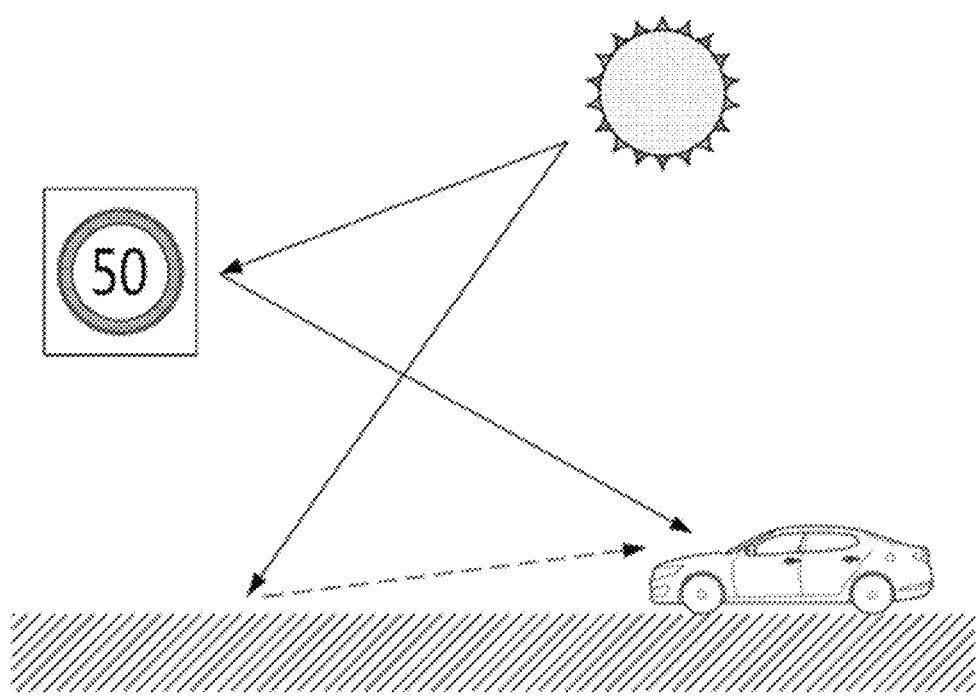
FIG. 1 is a schematic diagram in which follow light is incident into a camera of an image recognition apparatus.

Hereinafter, preferred embodiments of the present invention will be described in detail with reference to the accompanying drawings. Throughout the disclosure, like reference numerals refer to like parts throughout the various figures and embodiments of the present invention. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

When a camera is controlled such that a reflective traffic sign board can be well recognized at a dark place, a light emitting type traffic sign board is processed to be excessively bright, and when a camera is controlled such that the reflective traffic sign board can be well recognized at a bright place, the light emitting type traffic sign board is processed to be excessively dark.

In the case of the reflective traffic sign board, since characteristics shown on a screen are changed according to peripheral illumination, the case in which light from a light source is follow light and the case in which light from the light source is backlight will be described below by comparing them with each other.

The backlight indicates that light of the light source is directly incident into a camera, and the follow light indicates that light of the light source is not directly incident into the camera.

FIG. 1 illustrates the case in which follow light is incident into a camera of an image recognition apparatus, wherein since only light scattered from a road of light of a light source is incident into the camera, but most light reflected from a plate sign board is incident into the camera, the sign board is shown to be relatively brighter than the surrounding area.

Figure 2:
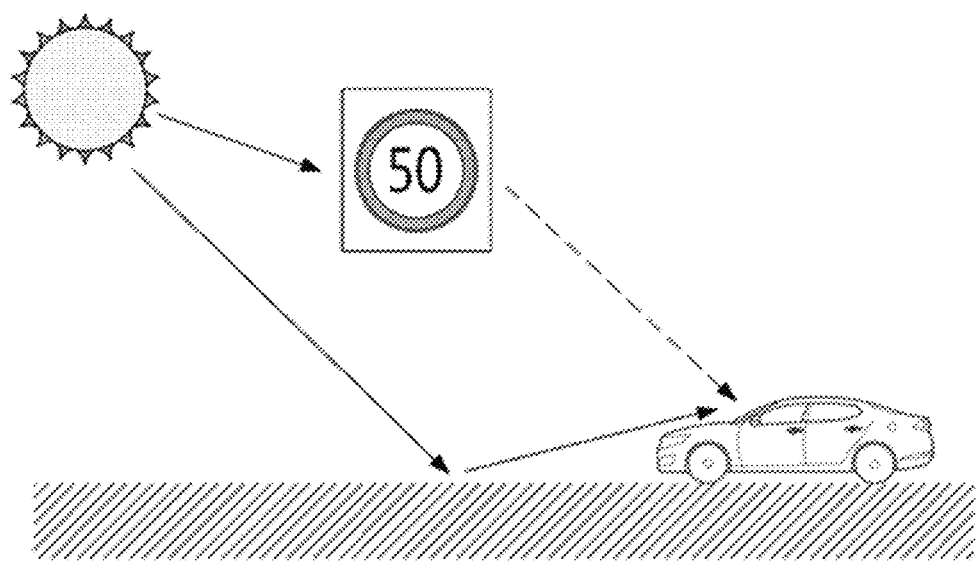
FIG. 2 is a schematic diagram in which backlight is incident into a camera of an image recognition apparatus.

FIG. 2 illustrates the case in which backlight is incident into a camera of an image recognition apparatus, wherein since most light reflected from a road of a light source is incident into the camera, but some of scattered light of the light source is reflected from a plate sign board and is incident into the camera, the sign board is shown to be relatively darker than the surrounding area.

Figure 3:
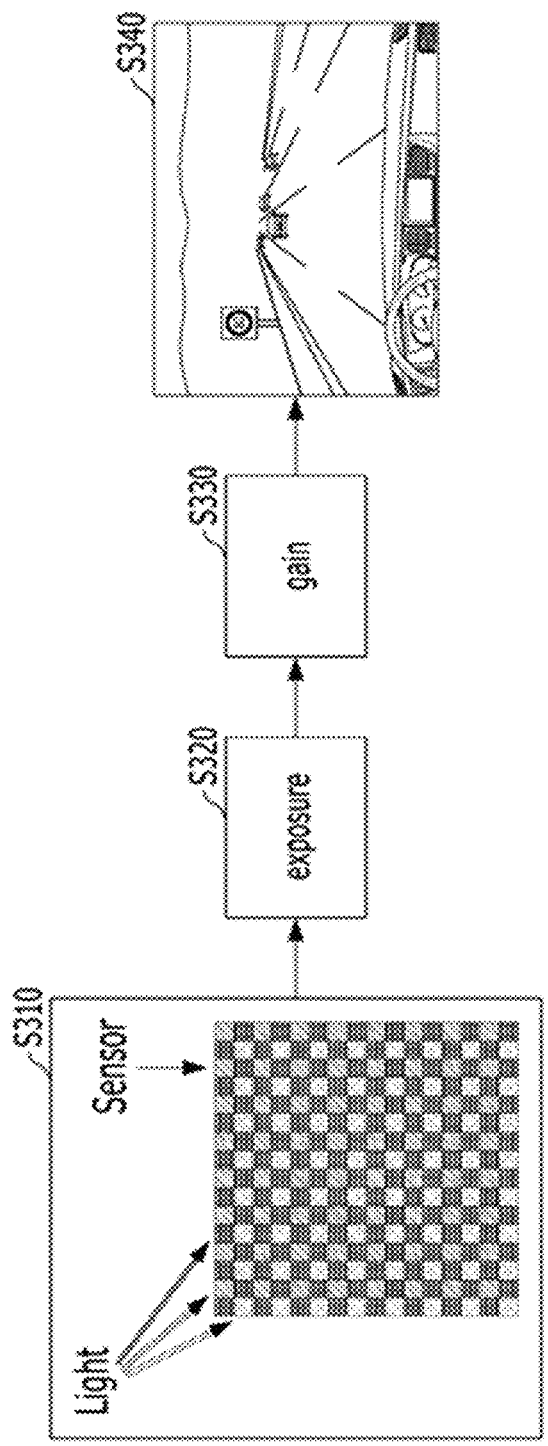
FIG. 3 is a conceptual diagram for explaining image generation of a digital camera.

FIG. 3 is a conceptual diagram for explaining image generation in a digital camera, wherein optical sensors in units of pixels are arranged in an array form in an image sensor of the camera and electric charge is generated by a photoelectric effect when light is incident (S310), the electric charge is exposed by light for a predetermined time and is accumulated (S320), and the accumulated electric charge is amplified (S330), so that an image having brightness corresponding to each pixel is generated (S340). The brightness of the image is decided by light exposure time for charge accumulation and an amplification ratio of a signal.

Meanwhile, when an image is excessively bright, since a shape of a lane and the like to be recognized is saturated, it is not recognized, and when an image is excessively dark, since a shape of a vehicle and the like to be recognized is hidden in a background, it is also difficult to be recognized. Accordingly, in order to improve image recognition performance, it is necessary to appropriately maintain the brightness of a screen.

Furthermore, in a camera of an image recognition apparatus, exposure and an amplification ratio are adjusted such that the average brightness of an entire screen or a region of interest (ROI) is constantly maintained, which is called auto-exposure control. That is, Equation 1 below is established between the target brightness of a screen and luminance of the region of interest, exposure, and gain.

$$\text{Brightness}_{Target} \propto \text{Luminance}_{ROI} \times \text{exposure} \times \text{Gain} \quad \text{Equation 1}$$

That is, it is possible to control the brightness of the screen to be constantly maintained by adjusting the exposure or the gain, or simultaneously adjusting the exposure and the gain in correspondence to the luminance of the region of interest.

Figure 4:
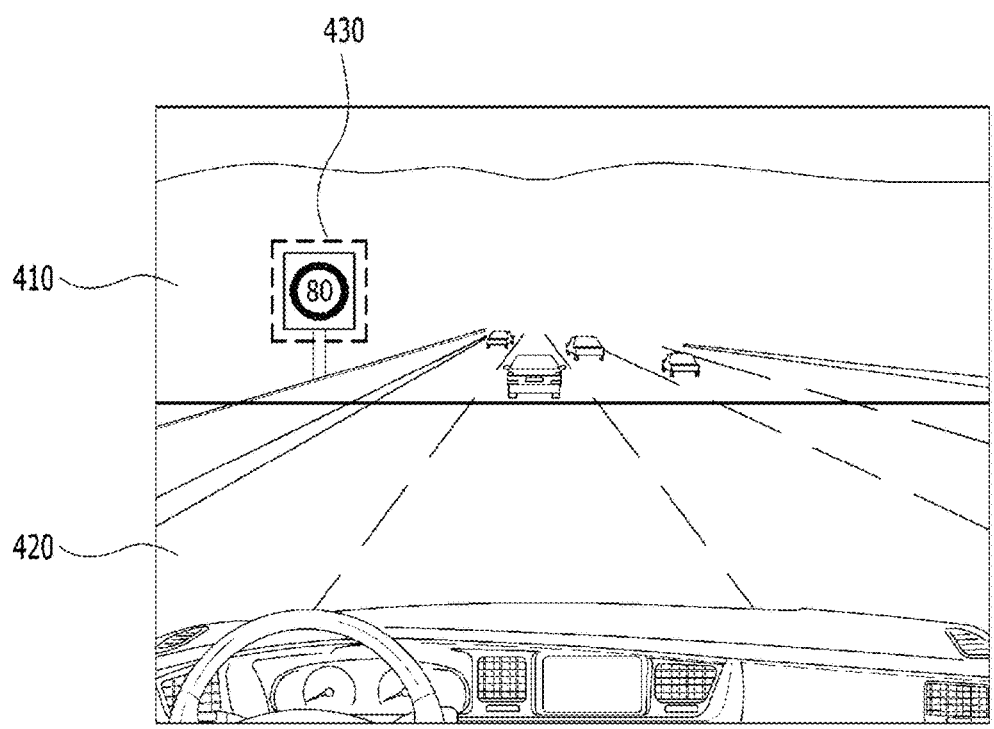
FIG. 4 is a photograph displaying a region of interest on a road in an image screen.

Meanwhile, as illustrated in a photograph displaying a region of interest on a road in an image screen of FIG. 4, since the road is always shown in a camera of an image recognition apparatus and can be estimated, the road is designated as a region of interest, so that the camera of the image recognition apparatus can be subjected to auto-exposure control (420). However, since a traffic sign board appears at a short time and then disappears during traveling, it is not possible to designate the traffic sign board as a region of interest and to allow the camera of the image recognition apparatus to perform the auto-exposure control (410).

Accordingly, since a reflective sign board has reflective characteristics different from those of a road according to the direction of the sun, when the reflective sign board is captured by the camera of the image recognition apparatus, it is highly probable that it is difficult to recognize the reflective sign board from an image captured by the camera.

In this regard, the present invention is devised.

Figure 5:
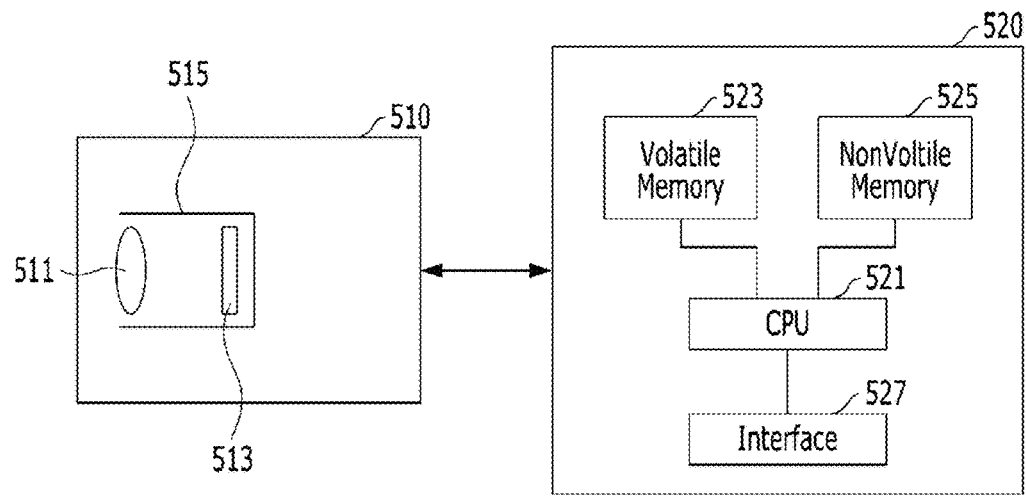
FIG. 5 is a block diagram of an image recognition apparatus according to an embodiment of the present invention.

FIG. 5 is a block diagram of an image recognition apparatus according to an embodiment of the present invention, and includes a camera unit 510 and an image processing unit 520.

The camera unit 510 includes a lens 511, an image sensor 513, a lens fixing section 515 that fixes the lens and the image sensor, an operation control memory 517, and a first power supply (not illustrated) that supplies power to the image sensor.

The operation control memory 517 stores setting parameters (an exposure time and gain) for an operation of a camera according to each image frame.

The image processing unit 520 includes a CPU 521 that stores setting parameters according to each corresponding frame in the operation control memory 517 at a predetermined time interval and processes an image output from the image sensor 513, a volatile memory 523 that stores original image data and image data being processed, a nonvolatile memory 525, an interface 527 that transmits/receives signals to/from other electronic devices of a vehicle, and a power supply (not illustrated) that supplies power to each element.

Figure 6:
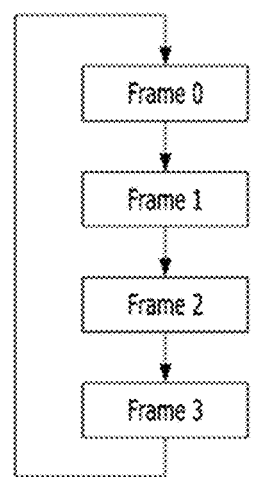
FIG. 6 is a conceptual diagram for explaining the generation of a plurality of images according to an embodiment of the present invention.

FIG. 6 is a conceptual diagram for explaining the generation of a plurality of images according to an embodiment of the present invention, wherein it is possible to repeatedly generate a plurality of image frames in which factors for adjusting the target brightness of a screen by the camera unit 510 of the image recognition apparatus have been differently set.

According to an embodiment of the present invention, an image recognition system can form four frames (frame 0 to frame 3) as one group and can periodically generate the four frames. That is, the image recognition system captures images having different characteristics in the same period of time, analyzes each image to select an image suitable for sign board recognition, and analyzes a sign board region of the corresponding image, thereby recognizing sign board information.

In detail, according to an embodiment of the present invention, the image recognition system designates a road region or an entire screen as a region of interest in the frame 0 and applies the auto-exposure control. Then, an exposure time of the camera lens and gain of an image in the frame 0 can be stored in the operation control memory 517, and can be provided as a reference value for adjusting the brightness of another frame. The frame 0 is available for recognizing a sign board when light is not excessive backlight or excessive follow light. According to an embodiment of the present invention, the image recognition system can constantly maintain the brightness of an entire screen or a region of interest by fixing the exposure time of the camera lens and adjusting the gain of the image. According to another embodiment of the present invention, the image recognition system can constantly maintain the brightness of the entire screen or the region of interest by fixing the gain of the image and adjusting the exposure time of the camera lens. According to further another embodiment of the present invention, the image recognition system can constantly maintain the brightness of the entire screen or the region of interest by adjusting the exposure time of the camera lens and the gain of the image.

The excessive backlight indicates the case in which the sun is positioned in front of the camera and at the back of the sign board, and the excessive follow light indicates the case in which the sun is positioned at the back of the camera and in front of the sign board.

In the case of the excessive backlight, the reason by which the recognition of the sign board is difficult will be described below with reference to Equation 1 above. In the state in which the target brightness of the screen has been constantly maintained, when the luminance of the region of interest is increased by backlight, the CPU 521 in the image processing unit 520 reduces the exposure time of the camera lens and the gain of the image according to the auto-exposure control function. Meanwhile, since the luminance of the sign board is decreased by the backlight, the brightness of the sign board is decreased, so that the recognition of the sign board is not possible.

Accordingly, according to an embodiment of the present invention, the exposure time of the camera lens corresponding to the frame 1 and the gain of the image are stored in the operation control memory 517, and the CPU 521 in the image processing unit 520 reads a parameter (an exposure time and/or gain) setting value, to which over-exposure control for adjusting the brightness of a screen in the frame 1 to be brighter than that of the frame 0 (auto-exposure control) has been applied, from the operation control memory 517, and processes the image. In the frame 1, since other parts are saturated but the sign boar part is brightly shown, the recognition of the sign board is possible.

According to an embodiment of the present invention, in the operation control memory 517 in the image recognition system, the exposure time of the camera lens set to be longer than that of the frame 0 by a predetermined time and the gain of an image set to be equal to that of the frame 0 can be stored.

Furthermore, according to another embodiment of the present invention, in the operation control memory 517 in the image recognition system, the gain of an image set to be higher than that of the frame 0 by a predetermined ratio and the exposure time of the camera lens set to be equal to that of the frame 0 can be stored.

Furthermore, according to further another embodiment of the present invention, in the operation control memory 517 in the image recognition system, the exposure time of the camera lens and the gain of an image respectively set to be higher than those of the frame 0 by a predetermined value can be stored.

Furthermore, according to further another embodiment of the present invention, in the operation control memory 517 in the image recognition system, multiplication of the exposure time of the camera lens and the gain of an image set to be higher than that of the frame 0 can be stored.

In the case of the excessive follow light, the reason by which the recognition of the sign board is difficult will be described below with reference to Equation 1 above. In the state in which the target brightness of the screen has been constantly maintained, when the luminance of the region of interest is decreased by follow light, the image processing unit 520 increases the exposure time of the camera lens and the gain of the image such that the target brightness of the screen is constantly maintained, according to the auto-exposure control function. Meanwhile, since the luminance of the sign board is increased by the follow light, the brightness of the sign board is increased and saturated, so that the recognition of the sign board is not possible.

Accordingly, according to an embodiment of the present invention, the CPU 521 in the image processing unit 520 reads a parameter (an exposure time and/or gain) setting value, to which low exposure control for adjusting the brightness of a screen in the frame 2 to be darker than that of the frame 0 (auto-exposure control) has been applied, from the operation control memory 517, and processes the image. In the frame 2, since other parts are dark but the sign boar part is brightly shown, the recognition of the sign board is possible.

According to an embodiment of the present invention, in the operation control memory 517 in the image recognition system, the exposure time of the camera lens set to be shorter than that of the frame 0 by a predetermined time and the gain of an image set to be equal to that of the frame 0 can be stored.

Furthermore, according to another embodiment of the present invention, in the operation control memory 517 in the image recognition system, the gain of an image set to be lower than that of the frame 0 by a predetermined value and the exposure time of the camera lens set to be equal to that of the frame 0 can be stored.

Furthermore, according to further another embodiment of the present invention, in the operation control memory 517 in the image recognition system, the exposure time of the camera lens and the gain of an image respectively set to be lower than those of the frame 0 by a predetermined value can be stored.

Furthermore, according to further another embodiment of the present invention, in the operation control memory 517 in the image recognition system, multiplication of the exposure time of the camera lens and the gain of an image set to be lower than that of the frame 0 can be stored.

Accordingly, according to an embodiment of the present invention, the CPU 521 in the image processing unit 520 reads a parameter (an exposure time and/or gain) setting value, to which constant exposure control for constantly maintaining the exposure time of the camera lens and the gain of an image regardless of the brightness of the entire screen or the region of interest has been applied, from the operation control memory 517, and processes the image. According to an embodiment of the present invention, in the operation control memory 517 in the image recognition system, the exposure time of the camera lens and the gain of an image fixedly set as predetermined values in correspondence to the frame 3 and can be stored.

Since the light emitting type sign board maintains constant brightness regardless of surrounding brightness, the recognition of the sign board is easy in the frame 3 as compared with the frame 0 based on the auto-exposure control in which the exposure time of the camera lens and the gain of an image are differently controlled according to the surrounding brightness.

According to an embodiment of the present invention, at least one of a plurality of frames forming group 1 may be a frame in which gain has been controlled such that the average brightness of a road region is equal to predetermined reference brightness while constantly maintaining the exposure time of the camera lens.

Furthermore, according to an embodiment of the present invention, after the brightness of the frame 0 is compared with the brightness of an input image, it is determined as a daytime condition when the brightness of the input image is equal to or more than the brightness of the frame 0, and it is determined as a night condition when the brightness of the input image is equal to or less than the brightness of the frame 0, so that it is possible to change and apply parameter setting of at least one of a plurality of frames forming group 1.

Furthermore, according to an embodiment of the present invention, by using a head lamp signal of a vehicle, it is determined as a daytime condition when the head lamp signal is OFF and it is determined as a night condition when the head lamp signal is ON, so that it is possible to change and apply parameter setting of at least one of a plurality of frames forming group 1.

Furthermore, according to another embodiment of the present invention, the image processing control unit of the camera can form at least two of the frame 0 to the frame 3 as one group and periodically generate the frames. For example, in the case of traveling a highway under backlight, the image processing control unit of the camera can periodically generate the frame 0, the frame 1, and the frame 3.

Furthermore, in the case of traveling a highway under follow light, the image processing control unit of the camera can periodically generate the frame 0, the frame 2, and the frame 3. Furthermore, in the case of traveling at night, the image processing control unit of the camera can periodically generate the frame 0 and the frame 3.

Figure 7:
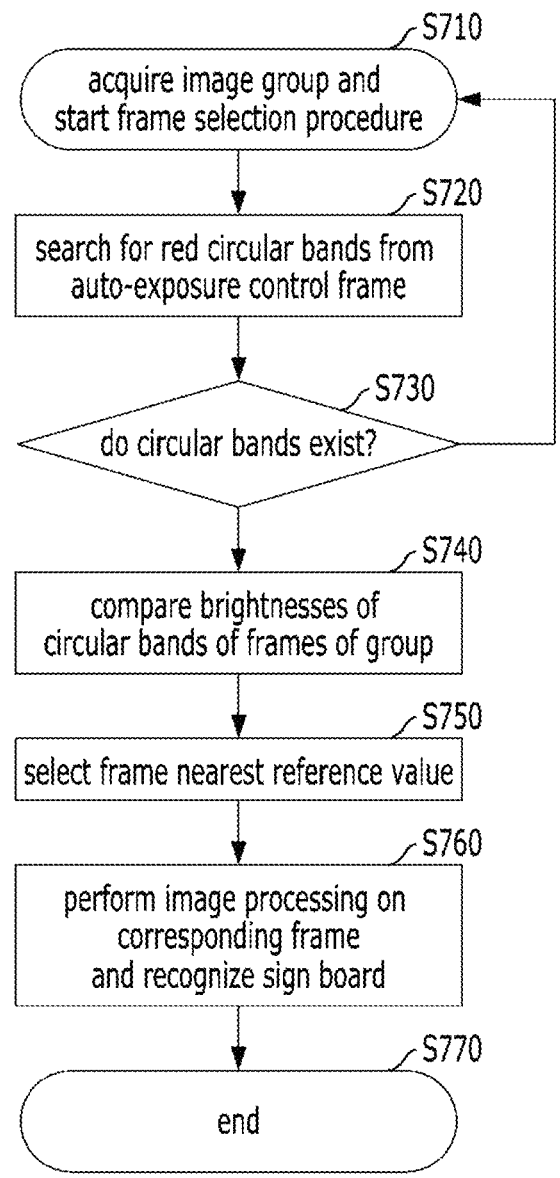
FIG. 7 is a flowchart for explaining frame selection according to an embodiment of the present invention.

FIG. 7 is a flowchart for explaining frame selection according to an embodiment of the present invention.

When image frames of group 1 are acquired and a procedure for selecting a frame is started (S710), red circular bands of the frame 0 (the auto-exposure control frame) are searched (S720). When the red circular band exists (S730), the brightnesses of the circular bands existing in the frames of the group are compared with each other (S740), a frame including a circular band nearest to a preset reference value is selected (S750), the selected frame is subjected to image processing to recognize a sign board (S760), and the procedure is ended (S770).

So far, the red circular band has been described as an example, but a traffic sign board is not limited to such color and shape. For example, the traffic sign board may be rectangular or triangular, and may be blue or green. Since a technology for detecting a traffic sign board having such color and shape is obvious for those skilled in the art, a detailed description thereof will be omitted.

What is claimed is:

1. A traffic sign board recognition method comprising the steps of:

acquiring an image group including a plurality of frames;

searching for bands having predetermined colors and predetermined shapes from an auto-exposure control frame of the plurality of frames;

comparing brightnesses of the bands existing in the plurality of frames of the image group with each other when there exist the bands having predetermined colors and predetermined shapes;

selecting a frame including a band nearest a preset reference value among the bands existing in the plurality of frames; and performing image processing on the selected frame and recognizing a sign board.

* * * * *